United States Patent [19]
Brown et al.

[11] Patent Number: 5,916,309
[45] Date of Patent: Jun. 29, 1999

[54] SYSTEM FOR DYNAMICALLY DETERMINING THE SIZE AND NUMBER OF COMMUNICATION BUFFERS BASED ON COMMUNICATION PARAMETERS AT THE BEGINNING OF THE RECEPTION OF MESSAGE

[75] Inventors: Rickey Carter Brown, Bardstown; Mark Lane Mayberry, Nicholasville, both of Ky.

[73] Assignee: Lexmark International Inc., Lexington, Ky.

[21] Appl. No.: 08/854,510

[22] Filed: May 12, 1997

[51] Int. Cl.[6] ............................. G06F 13/00; G06F 13/14
[52] U.S. Cl. .................................. 710/52; 710/56; 713/1; 370/110.1
[58] Field of Search ...................... 395/651, 115, 395/872, 876; 370/110.1; 400/124.01; 713/1; 710/52, 56

[56] References Cited

U.S. PATENT DOCUMENTS

| | | | |
|---|---|---|---|
| 4,158,235 | 6/1979 | Call et al. | 364/900 |
| 4,298,954 | 11/1981 | Bigelow et al. | 364/900 |
| 4,315,312 | 2/1982 | Schmidt | 364/200 |
| 4,378,588 | 3/1983 | Katzman et al. | 364/200 |
| 4,571,722 | 2/1986 | Bingham et al. | 370/106 |
| 4,780,815 | 10/1988 | Shiota | 364/200 |
| 4,845,710 | 7/1989 | Nakamura et al. | 370/110.1 |
| 4,965,748 | 10/1990 | Chang et al. | 364/519 |
| 4,977,519 | 12/1990 | Chang et al. | 364/519 |
| 5,038,277 | 8/1991 | Altman et al. | 364/200 |
| 5,046,039 | 9/1991 | Ugajin et al. | 364/900 |
| 5,125,096 | 6/1992 | Brantley, Jr. et al. | 395/800 |
| 5,130,986 | 7/1992 | Doshi et al. | 370/94.1 |
| 5,179,662 | 1/1993 | Corrigan et al. | 395/250 |
| 5,185,853 | 2/1993 | Cheng et al. | 395/115 |
| 5,197,128 | 3/1993 | Campbell et al. | 395/275 |
| 5,206,932 | 4/1993 | Chang et al. | 395/165 |

(List continued on next page.)

OTHER PUBLICATIONS

*HP LaserJet 5 and 5M Printer User's Manual* Using the Printer Control Panel–pp. 3–13 and Printer Memory–p. D–5.

*Primary Examiner*—Thomas C. Lee
*Assistant Examiner*—Rehana Perveen
*Attorney, Agent, or Firm*—Ronald K Aust; Frederick H. Gribbell

[57] ABSTRACT

An improved communications buffer system is provided which dynamically allocates the size and number of buffers to optimally receive packets of communications data over a communications link, while efficiently using the amount of available memory so as to provide optimal throughput capability with respect to the allocated amount of memory. This buffer system is readily adaptable for infrared communications ports used on printers. Once a communications session has begun, the printer will obtain sufficient information to most effectively allocate the size and number of buffers. At the beginning of this procedure, the printer must first determine how much "free" memory is available in its "pool area" and then determine how best to divide up that pool area into both transmit and receive buffers. The size and number of transmit buffers is first determined, and this determination is made after considering how much pool area is available in the printer's memory system at that moment. Once the size and number of transmit buffers has been determined, then the receive buffers are next configured. The first step is to perform a preliminary calculation to ensure that the receive buffer size is not set greater than the amount of data that can be received during the maximum turnaround time for this particular configuration between a host computer and the printer. After this has been determined, the receive buffer size is provisionally set to a power of 2, and the number of buffers is set equal to the remaining pool size divided by this receiver buffer size. After ensuring that there are at least a certain minimum number of receive buffers, then a "window size" is set to a certain maximum size, at least for infrared communications ports. Once the entire pool area has been allocated for these transmit and receive buffers, the communication session can begin between the host computer and the printer for communicating the actual print job data.

22 Claims, 7 Drawing Sheets

U.S. PATENT DOCUMENTS

| | | | |
|---|---|---|---|
| 5,276,781 | 1/1994 | Chang et al. | 375/116 |
| 5,289,470 | 2/1994 | Chang et al. | 370/94.1 |
| 5,301,275 | 4/1994 | Vanbuskirk et al. | 395/250 |
| 5,303,342 | 4/1994 | Edge | 395/164 |
| 5,303,347 | 4/1994 | Gagne et al. | 395/250 |
| 5,313,582 | 5/1994 | Hendel et al. | 395/250 |
| 5,381,528 | 1/1995 | Brunelle | 395/250 |
| 5,382,968 | 1/1995 | Endoh | 346/153.1 |
| 5,412,780 | 5/1995 | Rushton | 395/250 |
| 5,440,692 | 8/1995 | Janicek | 395/700 |
| 5,442,747 | 8/1995 | Chan et al. | 395/164 |
| 5,490,237 | 2/1996 | Zimmerman et al. | 395/115 |
| 5,557,751 | 9/1996 | Banman et al. | 395/250 |
| 5,566,208 | 10/1996 | Balakrishnan | 375/240 |
| 5,566,315 | 10/1996 | Mililo et al. | 395/440 |
| 5,675,793 | 10/1997 | Crick et al. | 395/651 |
| 5,806,997 | 9/1998 | Kawanabe | 400/124.01 |

SYSTEM FOR DYNAMICALLY DETERMINING THE SIZE AND NUMBER OF COMMUNICATION BUFFERS BASED ON COMMUNICATION PARAMETERS AT THE BEGINNING OF THE RECEPTION OF MESSAGE

TECHNICAL FIELD

The present invention relates generally to communications equipment and is particularly directed to a printer of the type which contains an infrared communications port. The invention is specifically disclosed as a printer which dynamically allocates a set of transmit and receive buffers for use in receiving data over a communications link.

BACKGROUND OF THE INVENTION

Communications systems typically use one or more buffers to store data as it is received over a communications link until the receiving unit's processing system is able to digest the information. In most situations, the information coming into the buffer arrives at a data rate that is significantly different than the rate at which the data is consumed. In addition, if the processing system is serial in nature, the processing system is often busy performing some other task when the initial data arrives over the communications link, and therefore, the processor is not immediately available to jump from its other task to the new task of handling the data. Because of this circumstance, some of the conventional buffers can operate in a substantially autonomous mode to store the data in the buffer without any help from the main system processor, so that no data portions are lost before the processor can properly handle this data.

Some of the communications buffer handling systems have been disclosed in United States patents, such as U.S. Pat. No. 5,179,662 (by Corrigan), in which a system is disclosed in which Optimization I/O buffers are used to write data into or read data from auxiliary storage using a double buffer scheme. In this patent, the term auxiliary storage refers to magnetic or optical disks, which are notoriously slow for transferring data to or from their storage media. In the prior art, most computers use buffers to "page" data into and out of auxiliary storage. The buffers are located in a faster memory area, such as RAM. In Corrigan, when the user wants to send data to auxiliary storage, a first buffer is filled with data as the contents are written asynchronously to the auxiliary storage device. Without waiting for the asynchronous write to be completed, a second buffer is filled with data, and after that is filled, its contents are asynchronously written to the auxiliary storage device. If the first buffer has not completed its write operations by this time, then a determination is made that the buffers are too small in size, and the size of both buffers is increased. This increase in size is performed incrementally and continues until the computer does not have to wait synchronously for one buffer to complete its write operation before it can refill that buffer with new data. On the other hand, the buffers could be too large in size, and this is determined to be true when the first buffer completes its write operation before the second buffer is filled beyond a predetermined threshold percentage. If so, the size of both buffers is decreased. Ideally, the first buffer should complete its write operation when the second buffer is filled beyond the predetermined threshold percentage, such as 50%.

Another patent, U.S. Pat. No. 5,289,470 (by Chang), discloses a memory buffer system for storing data packets in a networking device. The networking device has a plurality of buffers, and each buffer set has individual buffers of a certain size. For example, Buffer Set 1 may have 8 buffers, all of the same size. Buffer Set 2 may have 6 buffers, all the same size, however, the buffers in Set 2 are larger than the buffers in Set 1. In the example illustrated in this patent, there are five different sets of buffers, each having a size increasingly larger as the set numeral designation increases. When a data packet is received at the networking device, a buffer is initially allocated from Buffer Set 1. If the packet size does not exceed this allocated buffer size, the entire packet is stored in that buffer. Otherwise, a portion of the data packet fills this first buffer, and another buffer from Set 2 is allocated to store the rest of this packet. If the packet still does not fit within the combined buffers from Set 1 and Set 2, then a buffer from Set 3 is allocated to store this packet. This increasing allocation of larger buffers is continued until the entire data packet is stored in one or more buffers.

Another patent, U.S. Pat. No. 5,303,347 (by Gagne) discloses a network data receiving device that transfers packets of information having different attributes into buffers in a host memory. This memory would be dedicated to particular attribute values or ranges of values, and uses multiple shared data structures in the form of receive rings, each associated with memory buffers dedicated to a particular range of values for a particular packet attribute. An incoming packet is directed to a buffer that has attributes that correspond to attributes of the packet. Some of the attributes that can be used in directing packets into certain types of buffers include (1) packet size, (2) network user identification, (3) a combination of both size and user ID, and (4) other types of attributes such as source ID and data type.

U.S. Pat. No. 5,566,315 (by Milillo) discloses a cache memory space in a computer that is controlled on a dynamic basis by adjusting its low and high thresholds. The low and high thresholds are adjusted based on the number of allocations that are accomplished in response to I/O requests, and on the number of blockages that occur when an allocation cannot be accomplished. The low threshold is set in a direct relationship to a "allocation predictor," and the high threshold is set in a predetermined direct relationship to a "blockage predictor." Cache space is released to increase the amount of free space in cache memory when the amount of free space decreases to the low threshold, and cache space ceases to be released when the amount of free space reaches the high threshold.

U.S. Pat. No. 5,442,747 (by Chan) discloses a multimedia video processor chip having a multi-port central cache memory to queue all incoming data and all outgoing data. Each storage area of the cache is dedicated to storing data from a specific data source. The cache boundaries are chosen that the storage areas are optimized for worst case conditions for data streams in a given mode. No FIFO devices are used to queue the data, and instead, a single central cache is used to queue all data being input or output. The cache is a random access memory (RAM), and its internal boundary areas can be changed when a mode is changed. Three modes disclosed include: (1) where two input streams of interlaced frame data are to be stored in the RAM, with an output data stream that will be non-interlaced image data incorporating the two input streams; (2) a single stream of input data is buffered, and two streams of output data are buffered; and (3) where input data is queued and ultimately captured by a hard disk without being displayed. A boundary control circuit allocates a different group of registers in the buffer such that each group of registers only contains data from a single one of the data sources. The size of each group of registers depends upon the particular mode of operation selected for the video image memory system.

U.S. Pat. No. 5,130,986 (by Doshi) discloses a fiber optic long distance data communication system that requires the receiver to acknowledge to the transmitter for each block of data packets received. Two windows are created: (1) a "network window" that limits the data in the network, having a size set to the value of the bandwidth delay product; and (2) a "receiver flow control window" that temporarily holds the received data to assure that packets are not dropped or lost. The receiver flow control window is set to a value that is greater than or equal to twice the size of the network window.

U.S. Pat. No. 5,440,692 (by Janicek) discloses a D-Base2 buffer pool which can be dynamically expanded or contracted. The expansion requests will be rejected if the virtual storage space remaining would fall below 10 Mbytes. If the expansion request is accepted, it allocates pages of 4K or 32K in size. A contraction request looks first to the type of queue in the buffer. If the type of queue is an "in use" chain, the buffer is not released. If the type of queue is "never used" chain, then it is released. A "previously used" chain is released if the DB2 application is finished with the chain.

U.S. Pat. No. 5,046,039 (by Ugajin) discloses a buffer management system in which the overall buffer size is a constant, but the ratio of the transmitter buffer size to receiver buffer size is variable. When the receiver buffer busy state occurrences per time interval becomes greater than a preset value, the receiver buffer area (or the number of receiver buffers) is increased, and the transmitter buffer area is decreased by the same amount.

U.S. Pat. No. 4,158,235 (by Call) discloses a buffer storage system in which input/output buffers can each be accessed by any of a plurality of I/O ports. Memory cells are assigned by a logical name, which must match the name requested by the data port.

SUMMARY OF THE INVENTION

Accordingly, it is a primary object of the present invention to provide a printer that dynamically allocates buffer size and number of buffers according to the amount of available memory in a "pool area" of the main system memory available for use as buffers, and according to the communications parameters of the port for which these buffers are allocated.

It is another object of the present invention to provide a printer which can communicate with a sending station via an infrared communications port according to the Infrared Data Association Protocol.

It is a further object of the present invention to maximize the utilization of memory in a printer by increasing the size and/or buffers or increasing the number of buffers as required to efficiently store print job data that is being received by the printer, while at the same time allocating the number and size of buffers according to the communications parameters of the particular communications link over which the data is being received.

It is yet a further object of the present invention to provide a printer having an infrared communications port and, during discovery with a particular host device, which allocates the size and number of buffers in the printer's memory to most efficiently receive data from that host according to the communications parameters determined during the discovery procedure.

It is yet another object of the present invention to provide a communication device for use with infrared communication links which efficiently uses the amount of available memory for its buffers by allocating the appropriate size and number of buffers for use with a maximum transmit packet size of communication data that can be transmitted by a host station on the other end of the communications link.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved communications buffer system is provided which dynamically allocates the size and number of buffers to optimally receive packets of communications data over a communications link, while efficiently using the amount of available memory so as to provide optimal throughput capability with respect to the allocated amount of memory. This buffer system is readily adaptable for infrared communications ports, and the dynamic allocation occurs after a "discovery" dialog procedure during which the sending infrared port and receiving infrared port share communications parameters, then both devices switch to a set of agreed-upon communications parameters. After that has occurred, the communications buffer system optimizes the size and number of buffers according to the principles of the present invention. In general, once the sending device disconnects (i.e., ends the communications session), the communications buffer system of the present invention goes back to its default setup.

The communications buffer system of the present invention also lends itself well to being contained in a printing apparatus which receives data, generally in the form of a print job, from one or more host computers and via one or more port on the printer. This type of printer can typically receive data over several different types of ports, including a parallel port, serial port, network port, and an infrared port. The principles of the present invention can be used to dynamically allocate the size and number of buffers for any one of these various types of ports, and as related above, is particularly useful when used with infrared communications ports, since the IrDA (Infrared Data Association) protocol allows the possibility of various transmission rates, data packet sizes, maximum turnaround times, and other communications parameters to vary from one host-receiver combination to another. Until the discovery dialog procedure is preformed, the receiving printer apparatus really has no realistic way of knowing what the optimum buffer setup should be, since the communications parameters can vary by a large extent.

Once a communications session has begun, and a host computer and printer of the present invention have established a discovery dialog, the printer will obtain sufficient information to most effectively allocate the size and number of buffers. At the beginning of this procedure, the printer must first determine how much "free" memory is available in its "pool area" and then determine how best to divide up that pool area into both transmit and receive buffers. It is important to not only increase the size of these buffers, but very often it is equally important to increase the number of the buffers for various reasons. In particular, if a communications data rate is quite fast for a particular host computer and printer combination, then more than one data packet could be transmitted and received between the host computer and printer during a single transmission session. It is generally very effective to allow the printer to store each packet of information into a single buffer, and therefore, in order to receive a plurality of packets, the printer should make available a like plurality of receive buffers. Of course, each of these receive buffers would have sufficient memory allocated to the buffer so that it could store an entire maximum packet size for each packet of a particular transmission sequence.

In another aspect of the present invention, at the time of the initial reception of the data message, the size and number of transmit buffers is first determined, and this determination is made after considering how much pool area is available in the printer's memory system at that moment. Once the size and number of transmit buffers has been determined, then the receive buffers are next configured. The first step is to perform a preliminary calculation to ensure that the receive buffer size is not set greater than the amount of data that can be received during the maximum turnaround time for this particular configuration between a host computer and the printer. After this has been determined, the receive buffer size is provisionally set to a power of 2, and the number of buffers is set equal to the remaining pool size divided by this receiver buffer size. After ensuring that there are at least a certain minimum number of receive buffers, then a "window size" is set to a certain maximum size, at least for infrared communications ports. Once the entire pool area has been allocated for these transmit and receive buffers, the communication session can begin between the host computer and the printer for communicating the actual print job data.

A primary advantage of this method of buffer management is in its optimized memory utilization. The memory available for the port is always used in a manner that is most advantageous for the current connection parameters. The fact that these parameters can change while the system is running requires dynamic adjustment. Another advantage of this system is that the data does not need to be copied out of the packet buffer where it was received into a ring awaiting consumption. The data is instead consumed directly out of the packet buffer.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
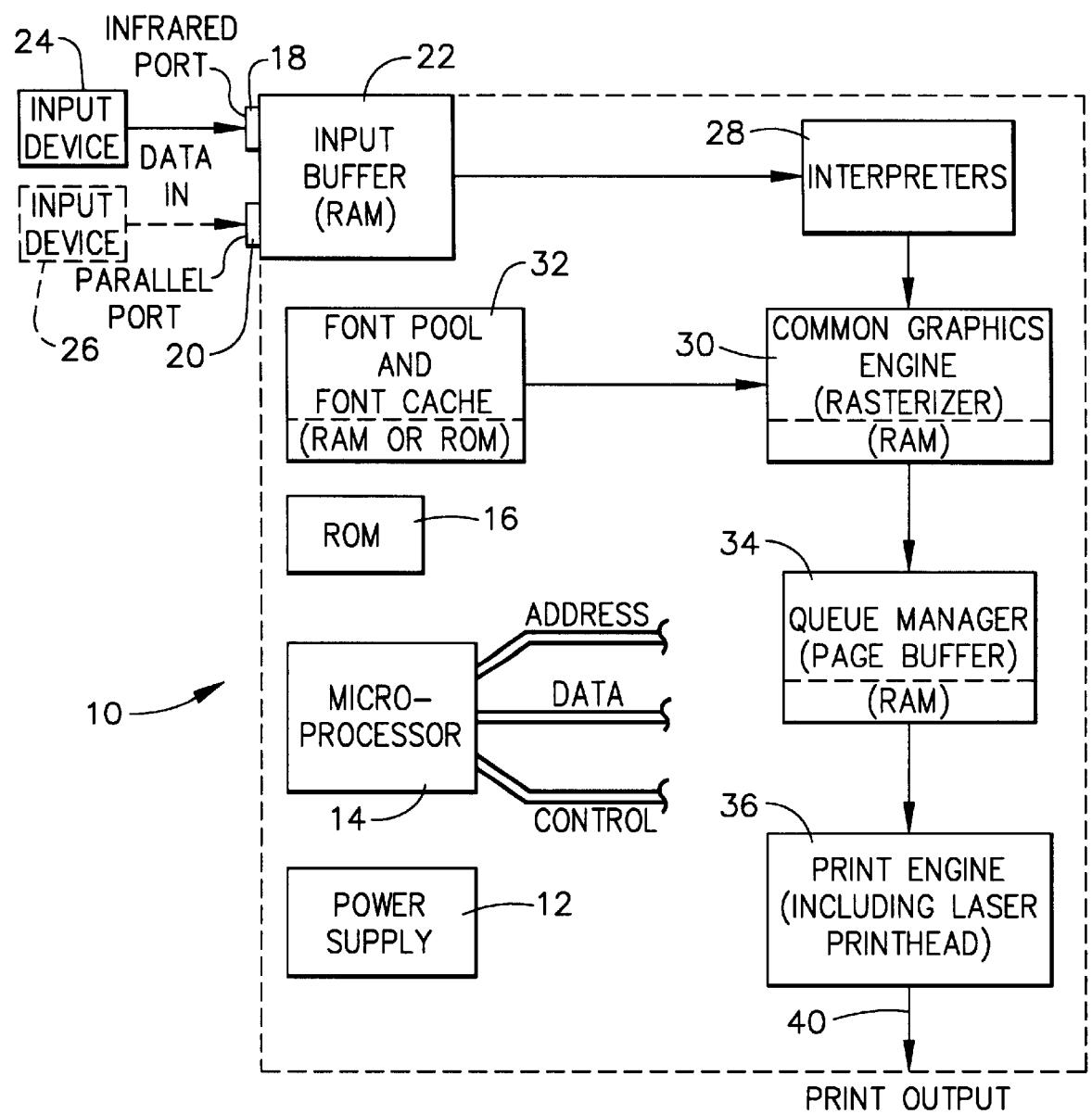
FIG. 1 is a block diagram of the major components of a printer, as constructed according to the principles of the present invention.

Referring now to the drawings, FIG. 1 shows a hardware block diagram of a laser printer generally designated by the reference numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM), which is divided into several portions for performing several different functions.

Laser printer 10 also contains at least one infrared input or parallel input port, or in many cases both types of input ports, as designated by the reference numeral 18 for the infrared port and the reference numeral 20 for the parallel port. Each of these ports 18 and 20 would be connected to a corresponding input buffer, generally designated by the reference numeral 22 on FIG. 1. Infrared port 18 would typically be in communication with an infrared output port of a personal computer or a workstation that would contain a software program such as a word processor or a graphics package or computer aided drawing package. Similarly, parallel port 20 could be connected to a parallel output port of the same type of personal computer or workstation containing the same type of programs. Such input devices are designated, respectively, by the reference numerals 24 and 26 on FIG. 1.

Once the text or graphical data has been received by input buffer 22, it is commonly communicated to one or more interpreters designated by the reference numeral 28. A common interpreter is PostScript™, which is an industry standard used by most laser printers. After being interpreted, the input data is sent typically to a common graphics engine to be rasterized, which typically occurs in a portion of RAM designated by the reference numeral 30 on FIG. 1. To speed up the process of rasterization, a font pool and possibly also a font cache is stored, respectively, in ROM or RAM within most laser printers, and these font memories are designated by the reference numeral 32 on FIG. 1. Such font pools and caches supply bitmap patterns for common alphanumeric characters so that the common graphics engine 30 can easily translate each such character into a bitmap using a minimal elapsed time.

Once the data has been rasterized, it is directed into a queue manager or page buffer, which is a portion of RAM designated by the reference numeral 34. In a typical laser printer, an entire page of rasterized data is stored in the queue manager during the time interval that it takes to physically print the hard copy for that page. The data within the queue manager 34 is communicated in real time to a print engine designated by the reference numeral 36. Print engine 36 includes a laser light source within the print head, and its output 40 is the physical inking onto a piece of paper, which is the final print output from laser printer 10.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM and RAM integrated circuits, and the control lines or interrupt lines are typically directed to all input or output integrated circuits that act as buffers.

The buffer management scheme of the present invention works well for any packet oriented link protocol such as Ethernet, Token Ring or Local Talk. The infrared protocol, because of its dynamic nature, is currently the only one that makes use of all the features. Infrared ports communicate by having a sending station flash a light that is detected by a receiver. Due to the nature of the detector, if a station is transmitting data, its detector is blinded by its own transmission, and is thus unable to receive. This combined with the fact that two stations transmitting at the same time will irreparably garble the transmission, thereby making it imperative that only one station own the link at one time. This much is a common restriction among most network protocols.

The frequency of the light flashes at the sending station determine the data transfer rate over the link. Not all infrared devices are capable of transmitting and receiving data at the same speeds. Currently the data transfer rates range from 2,400 bits per second to 4 million bits per second. In order for optimal communications to occur stations must determine each others' capabilities. This is done through a procedure called "discovery." All infrared (IR) capable stations, if they are not actively engaged in a conversation, are placed into a state called "normal disconnect mode" (NDM).

IR stations are divided into two classes: "primaries" and "secondaries." Actually, these labels refer to the role a station is playing rather than acting as a permanent identification. When an IR station wants to initiate a dialog it assumes the role of a primary and starts a discovery process. Through a standardized process the primary determines the existence of all IR stations within its range. The data transfer parameters of the NDM state are well defined, and all stations in NDM are listening for traffic adhering to these parameters. However, NDM traffic is conducted at a slow data transfer rate (i.e., 9,600 bits per second), so the primary will want to switch to a faster data transfer rate if at all possible.

The primary will identify the station with which it wants to communicate and send a "set normal response mode" (SNRM) command to that station. This command is still sent in the NDM state, and indicates to the secondary that the primary wants to initiate a connection, and also indicates all the capabilities of the primary. The secondary will then compare the primary's capabilities to its own and determine the best set of communication parameters that both stations can support. It sends this information (still in the NDM state) back to the primary. At this point both stations switch to the new communication parameters and begin the connection. Some of the important communication parameters include data transfer rate, maximum turnaround time, minimum turnaround time, maximum packet size, and number of additional beginning-of-frames. All of these attributes are important because they affect the amount of data that can be sent and/or received in a single packet.

It is precisely the ability of the infrared protocol to dynamically adjust packet sizes that creates memory management problems. The problem is further compounded by the fact that (based on transmission speed) there are three different encoding schemes. Most network protocols (including IR) have certain reserved bit patterns to indicate special conditions (such as the beginning and end of packets, etc.). If these bit patterns happen to occur in the data, then they must be "quoted" in some manner to prevent misinterpretation. Two of the encoding schemes get around this problem using "bit stuffing." This essentially requires that there be hardware present to perform this operation, and thus does not affect buffer sizes. However, the third encoding scheme (for the slower data transmission speeds) is usually implemented in software and is done by "byte stuffing." This opens up the possibility that each data byte in a packet could take up to two bytes of buffer space, which must also be taken into account when adjusting buffer sizes.

One straightforward conventional approach in allocating buffers would be to take the amount of memory reserved for the IR link and divide it into a reasonable number of buffers, an input ring and an output ring. Then as data comes in, move it from the buffer to the input ring, and as data is generated to go out, move it from the output ring into a buffer for transmission. The disadvantage in such a scheme, however, is that the buffers would always have to be set to the maximum supported data packet size. Since the data packet size is negotiated dynamically and could potentially change from job to job, this arrangement results in potentially significant amounts of wasted buffer space. Furthermore, this allows no flexibility with respect to minimum memory requirements; the system must always assume the worst case and allocate space for the largest data packet size supported, regardless of whether this will actually be need or not (and which cannot be determined in advance).

On the other hand, an approach that constantly adjusts the buffers to the (dynamically negotiated) size of the packets will result in optimized memory utilization, and thus a greater port throughput. In the memory management scheme of the present invention, it is preferred to divide the memory only into packet buffers. In order to improve memory utilization the packet buffers are divided into input buffers and output buffers. This is done to optimize the system for different hardware enhancements (e.g., if data is "dequoted" in hardware, but must be quoted by software) as well as to optimize the system based on the station's purpose (e.g., a printer may want several large input buffers, but only a few small output buffers).

Upon initialization, the memory pool allocated to the IR link is divided between input and output buffers based on heuristics determined by the factors related above, as well as assuming the NDM set of communication parameters. Once a new set of communication parameters is received through a SNRM command, all unused buffers are invalidated, their memory is combined together, and a new set of buffers is created based on the same heuristics as before (however, now using the new communication parameters).

In the present invention, each of the above communication parameters may affect the decision as to how large to make each packet buffer. As used herein, the term "maximum turnaround time" refers to the total amount of time that a station may hold onto the communications channel before having to turn it around and allow the other station a chance to use it. Thus it serves no purpose to have either transmit or receive buffers that are larger than the amount of data that can be transmitted (based on the data transfer rate) within this time period. The "minimum turnaround time" refers to the amount of time that the link must remain idle after the sending station and receiving station switch roles. This time is used to allow a station's receiver to recover from the saturation caused by its own transmitter, and varies from device to device. This attribute further reduces the amount of time available for a station to send data. The "maximum packet size" is a parameter by which a station can indicate the largest packet buffer it can handle. Thus it serves no purpose to have a transmit buffer larger than this value. The number of "beginning-of-frames" (BOF's) is a parameter by which a station can request that all packets sent to it contain more than the default number of BOF's. Increasing this value further reduces the time available to send data, and thus affects buffer sizes.

Primary and secondary stations must negotiate and agree upon a common data transfer rate and maximum turnaround time during the "discovery" procedure. However, the other parameters are unique to each station. The maximum transmit packet buffer size for the secondary can be described as the minimum of either:

(1) {(maximum turnaround time−minimum turnaround time of primary)*(transmission speed in bytes per millisecond)−number of BOF's of primary}

OR (2) (maximum packet size of primary).

Similarly, the largest useful receive buffer size for the secondary is:

(1) {(maximum turnaround time−minimum turnaround time of secondary)*(transmission speed in bytes per millisecond)−number of BOF's of secondary}

OR (2) (maximum packet size of secondary).

These sizes may need to be adjusted based on hardware assist (or lack thereof) as well as optimizing for the main function of the device. Each time new data packet sizes are negotiated (potentially, each time a primary negotiates with the secondary), then the buffer sizes are recalculated and the unused memory space is reclaimed and divided into transmit and receive buffers as is appropriate for the device. As data is received into the packet buffer, it remains there and is queued in order with other packets that contain input data. This data is then revealed to the "consumer" on a packet-by-packet basis. The address of the data contained in the first packet along with the number of data bytes in that packet are the only things revealed to the consumer until all data in that packet is consumed. At this point the packet is freed and made available to receive more data, and the data in the next packet in the queue is revealed to the consumer.

Figure 2:
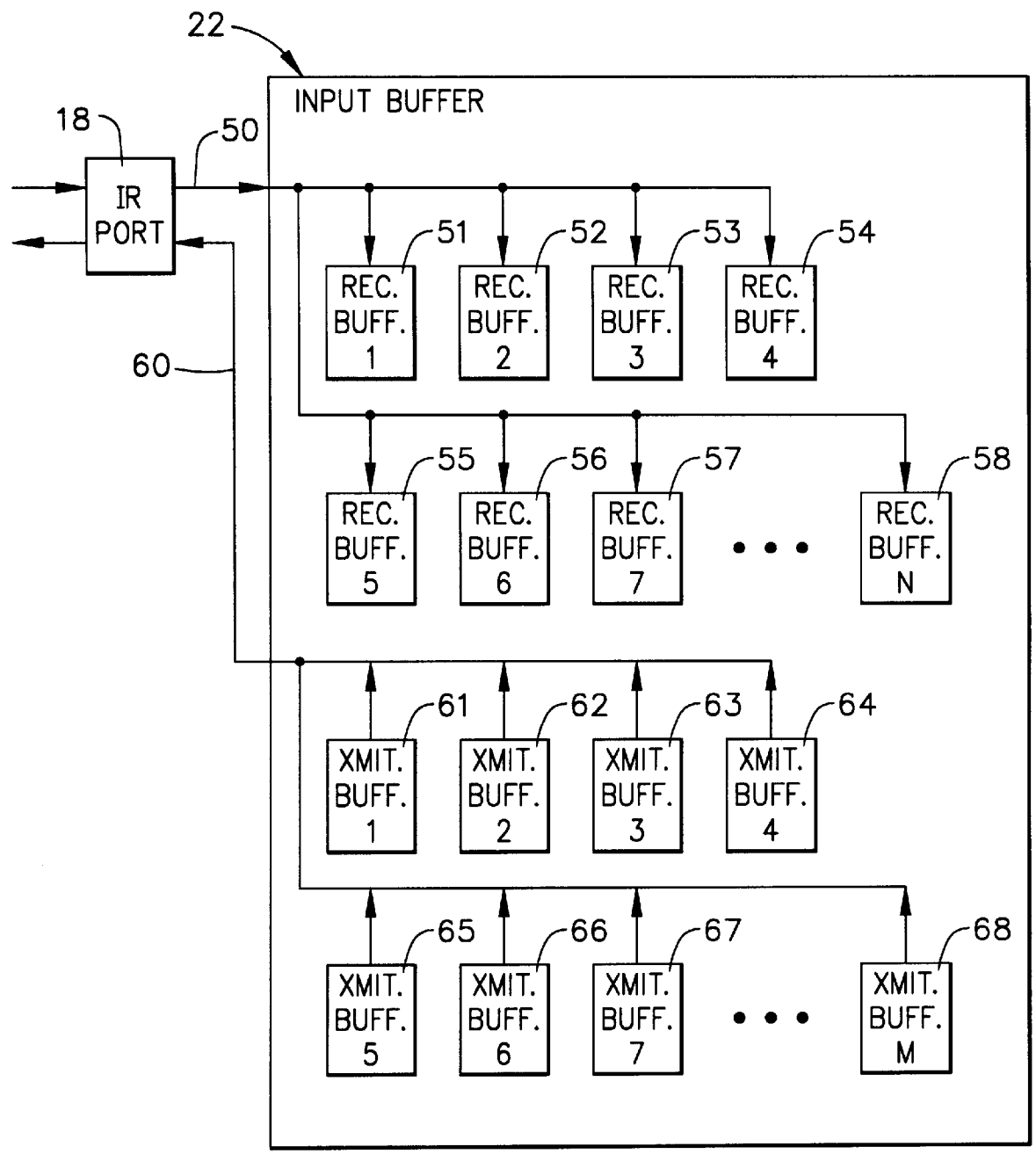
FIG. 2 is a diagrammatic view of portions of the input buffer of the printer depicted in FIG. 1.

In FIG. 2, the IR port 18 is depicted as being in communication with the input buffer 22. There are two communication directions, an input direction depicted by the reference numeral 50, and an output direction depicted by the reference numeral 60. As IR port 18 receives data packets from a host computer or other type of transmitting station, each packet is delivered, one-by-one, into one of the receive buffers depicted by the reference numerals 51–58. For example, if the transmitting (or "primary") station 24 and IR port 18 are both capable of communicating at a relatively fast data rate, then several data packets may be potentially transmitted and received within a single maximum turnaround time interval. According to the IrDA standard, there can be a maximum of seven packets transmitted within one turnaround time, and therefore, when using infrared ports on a fast communication link it would be useful to allocate seven receive buffers in input buffer 22 to receive these seven data packets, but fewer packets would be acceptable. As depicted on FIG. 2, Receive Buffer #1 is indicated at reference numeral 51, Receive Buffer #2 at reference numeral 52, and so on through Receive Buffer #7 at reference numeral 57.

It may be desirable to allocate more than seven overall receive buffers even where the maximum "window" size of packets per maximum turnaround time is limited to seven, because there may be situations where the printer's processing system cannot access the data in receive buffers 51–57 before the next transmission of data packets is received by the input buffer 22. Therefore, many more receive buffers may be desirable, and FIG. 2 depicts a maximum number of receive buffers for a particular configuration to be sized up to a "receive buffer N" at reference numeral 58.

FIG. 2 also depicts multiple transmit buffers at reference numerals 61–68. For a printing device, the desired size of each transmit buffer would likely be much smaller than the desired size of each receive buffer, since it is far more likely that a printer will receive large amounts of data than for a printer to be transmitting any large amounts of data. However, normally it is desirable to have several different transmit buffers available in the input buffer 22, so that the printer 10 may send multiple short messages out its IR port 18, and so the printer can also find a convenient place to temporarily store those messages to be transmitted, one per individual transmit buffer, until the communications link is actually available to send those data packets.

It will be understood that the maximum number of packets or sequences that can be transmitted in a single turnaround time period for other types of communications links may be a number much greater than seven, and consequently, input buffer 22 could be configured so that many more than seven receive buffers are allocated to handle such a communications port, without departing from the principles of the present invention. Similarly, for various other types of communications ports, the number of transmit buffers allocated may also be a much greater number than depicted on FIG. 2 without departing from the principles of the present invention. It will further be understood that the number and size of transmit and receive buffers can be allocated dynamically based upon various communications parameters and upon the maximum size of available memory in a common "pool area" of memory presently available for use as buffers for types of ports other than IR ports, while using the principles of the present invention.

Figure 3:
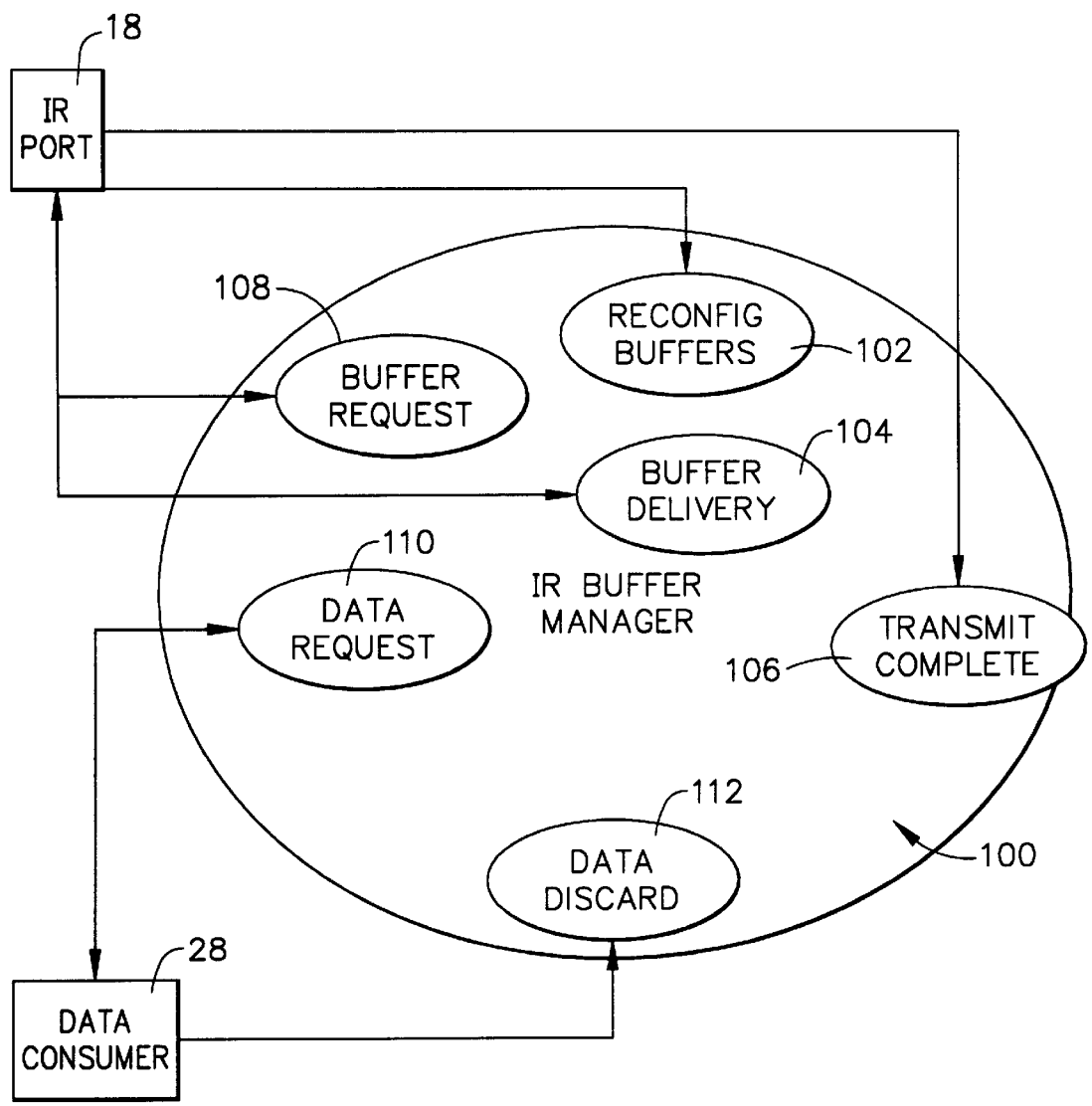
FIG. 3 is a diagrammatic view of the higher-level functions that are performed by an Infrared Buffer Manager for use with the infrared port of the printer depicted in FIG. 1.

FIG. 3 diagrammatically depicts the tasks of an IR Buffer Manager, generally depicted by the reference numeral 100. At the beginning of each dialog with a host computer, including the instance where the host computer is now attempting to send a print job to printer 10, IR port 18 will receive an initial communications message at the standard 9600 baud transmission data rate to determine the optimal data communications parameters that are commonly available to both the host computer (i.e., sending station) 24 and the printer (i.e., receiving station) 10, during a procedure called "discovery." During this discovery procedure, both devices agree upon the communications parameters to be used during the following data transmission, and in particular this includes the data communications rate. At the end of the discovery procedure, both devices (i.e., the transmitting station 24 and the receiving printer 10) then switch to the agreed-upon communications parameters. Once the devices have switched to the new communications parameters, the IR buffer manager will optimize its buffers by a procedure to reconfigure the buffers, as depicted at reference numeral 102. This is a fairly involved procedure, and will be described in greater detail hereinbelow.

After the buffers have been reconfigured, the transmitting station can now send its data in the form of a print job, or other type of communication message. As the data comes in IR port 18, a buffer is requested at a function 108, and a Buffer Delivery procedure is initiated at a function 104. The Buffer Delivery procedure 104 is described in greater detail hereinbelow. The Buffer Request function 108 is used to supply a buffer for incoming data. Once the buffers are reconfigured (using function 102), all of the buffers are empty (or "free") and the Buffer Request function 108 takes the "top" buffer from the free buffer list and delivers that buffer.

Other functions of the IR manager depicted on FIG. 3 are a Transmit Complete function 106, a Data Request function 110, and a Data Discard function 112. These functions are also described in greater detail hereinbelow. The Data Consumer 28 on FIG. 3 generally represents one or more interpreters that are found on a printer. Of course, if the communications system described herein were to be used on a non-printing apparatus, then the data consumer could be a different apparatus such as a non-volatile memory storage device or some type of monitor or display.

Figure 4A:
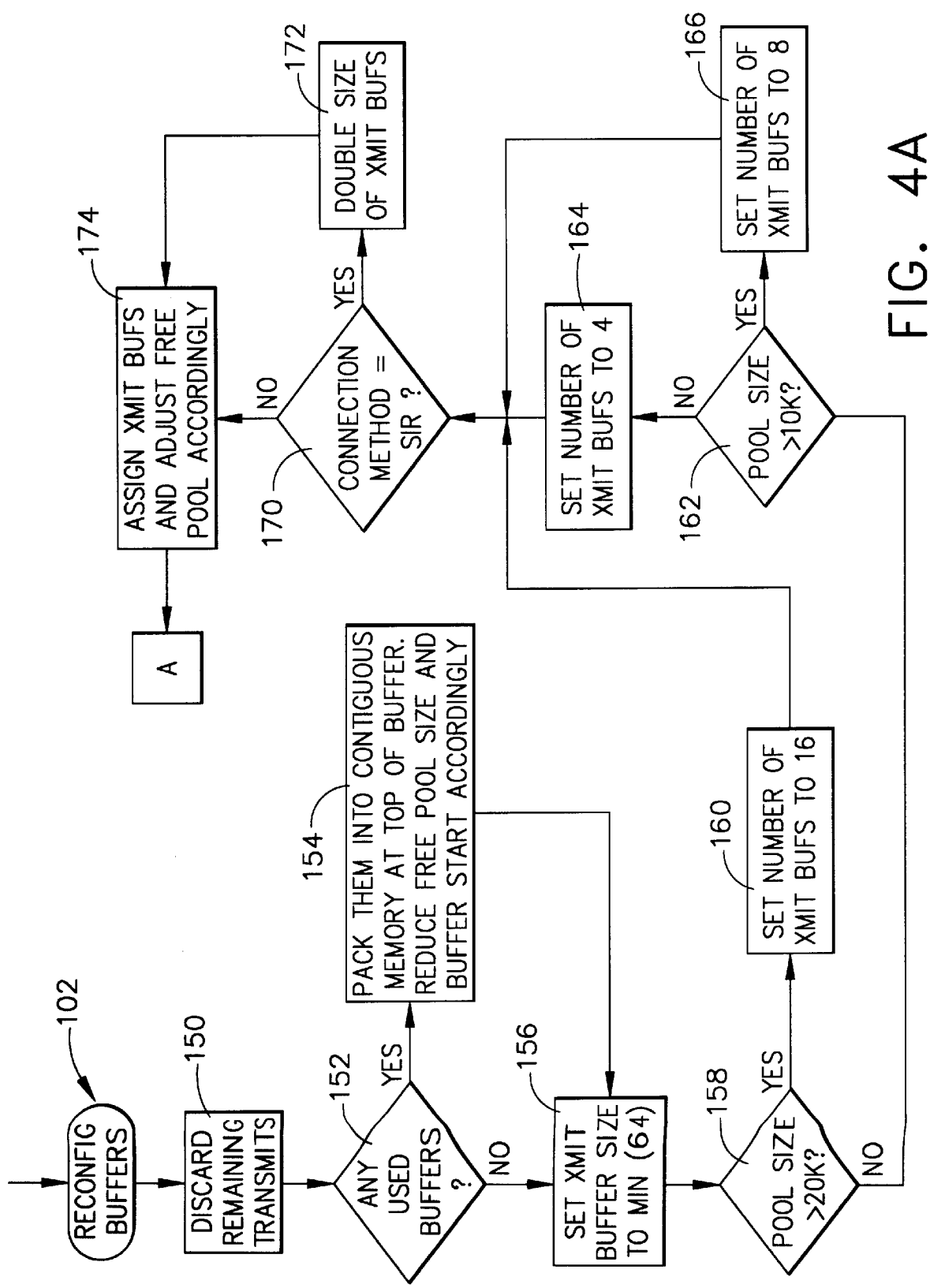
FIGS. 4A and 4B are a flow chart of the "Reconfigure Buffers" function of the Infrared Buffer Manager depicted in FIG. 3.
Figure 4B:
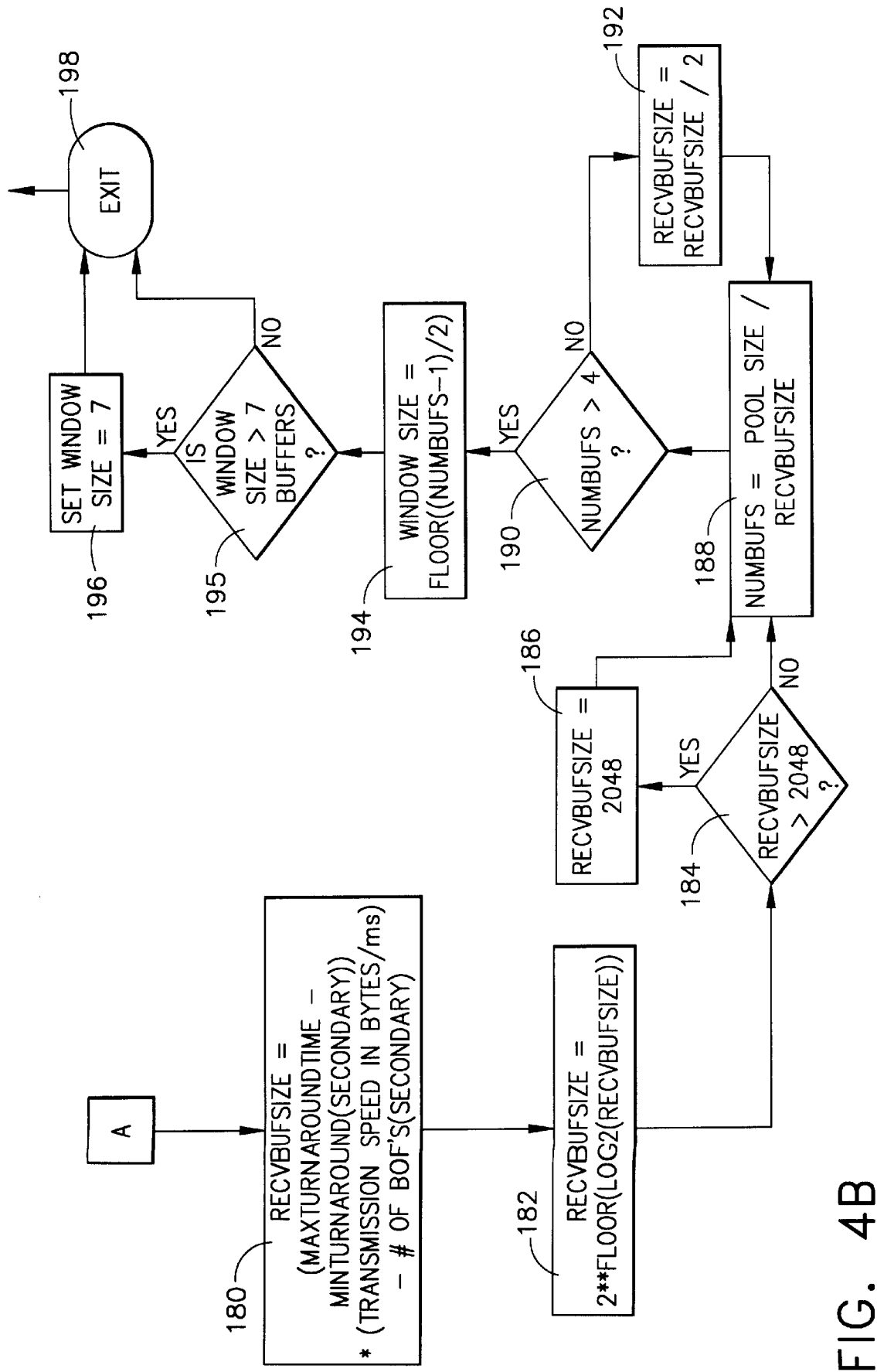

FIGS. 4A and 4B are a flow chart of the Reconfigure Buffers function 102. Starting with a function block 150, any remaining transmit information pertaining to this particular host only is discarded. The logic flow is now directed to a decision block 152 which determines whether or not there are any "used" buffers? This question is asking whether or not there are any receive buffers having unconsumed data at this time, and if the answer is YES, a function block 154 packs these buffers into contiguous memory at the top of the buffer in the free pool. The free pool size is then reduced, and the buffer allocation now begins and buffers are sized accordingly.

A function block 156 now sets the transmit buffer size, which for a printer is typically a very small size such as sixty-four (64) bytes. For the general case, the maximum transmit buffer size is equal to the minimum of either:

(1) {(maximum turnaround time–minimum turnaround time of primary)* (transmission speed in bytes per millisecond)–number of BOF's of primary}
OR (2) (maximum packet size of primary).

A decision block 158 now inspects the pool size to see if it is greater than 20 KBytes. If the answer is YES, a function block 160 now sets the number of transmit buffers to sixteen (16) for the case of the printer. If the answer is NO, a decision block 162 determines if the pool size is greater than 10 KBytes. If the answer is YES, a function block 166 sets the number of transmit buffers to eight (8), and if the answer is NO, a function block 164 sets the number of transmit buffers to four (4).

A decision block 170 now determines whether or not the connection method (i.e., the method of communications) for this port is SIR, which stands for "slow" Infrared. If the answer is YES, a function block 172 doubles the size of all transmit buffers, thereby allowing byte-stuffing which is required at SIR data transmission speeds, but which also requires a greater buffer size to support this byte stuffing process. A function block 174 now assigns the transmit buffers and adjusts the free pool size accordingly. The logic flow now arrives at a block "A" which directs the logic flow to FIG. 4B.

In FIG. 4B, the logic flow travels from block "A" to a function block 180, which sets the size of the receive buffers. The largest useful receive buffer size is equal to the minimum of either:

(1) {(maximum turnaround time minimum turnaround time of secondary)* (transmission speed in bytes per millisecond)–number of BOF's of secondary}

OR (2) (maximum packet size of secondary).

Function block 182 now adjusts the receive buffer size to the next highest power of two (2). A decision block 184 now inspects the receive buffer size to determine if is greater than 2 Kbytes (which is the maximum data buffer size according to the IrDA protocol). If the answer is YES, a function block 186 reduces the receive buffer size to 2048 bytes (i.e., 2K).

A function block 188 now sets the number of receive buffers. The size of the remaining pool area is divided by the newly determined receive buffer size, and this gives the number of receive buffers to be allocated. A decision block 190 now determines whether or not the number of receive buffers is greater than four (4). If the answer is NO, a function block 192 divides the size of the receive buffers by two (2). The logic flow is then directed back to function block 188, which sets the number of buffers equal to the pool area size divided by the receive buffer size (which is just been divided by two).

The logic flow is again directed back to decision block 190, and this logical "DO-loop" will continue until the number of receive buffers is greater than four (4). Once that has been achieved, the logic flow travels out the YES output from decision block 190 to a function block 194.

At function block 194, the "window size" is set equal to the truncated integer value of the quantity: (the number of buffers minus one, divided by two). As related hereinabove, the window size refers to the number of data packets that can be transmitted and received within a single turnaround time interval. It is preferred to set aside at least as many allocated buffers (if they are available) needed to fill the window size so that the maximum number of data packets can be received, one packet per buffer.

The logic flow is now directed to a decision block 195 that determine whether or not the window size is greater than seven (7) buffers. If the answer is YES, then a function block 196 sets the window size equal to seven (7), which is the maximum number of packets than can be transmitted in a single turnaround time using the IrDA protocol. A function block 198 now exits from this routine.

Figure 5:
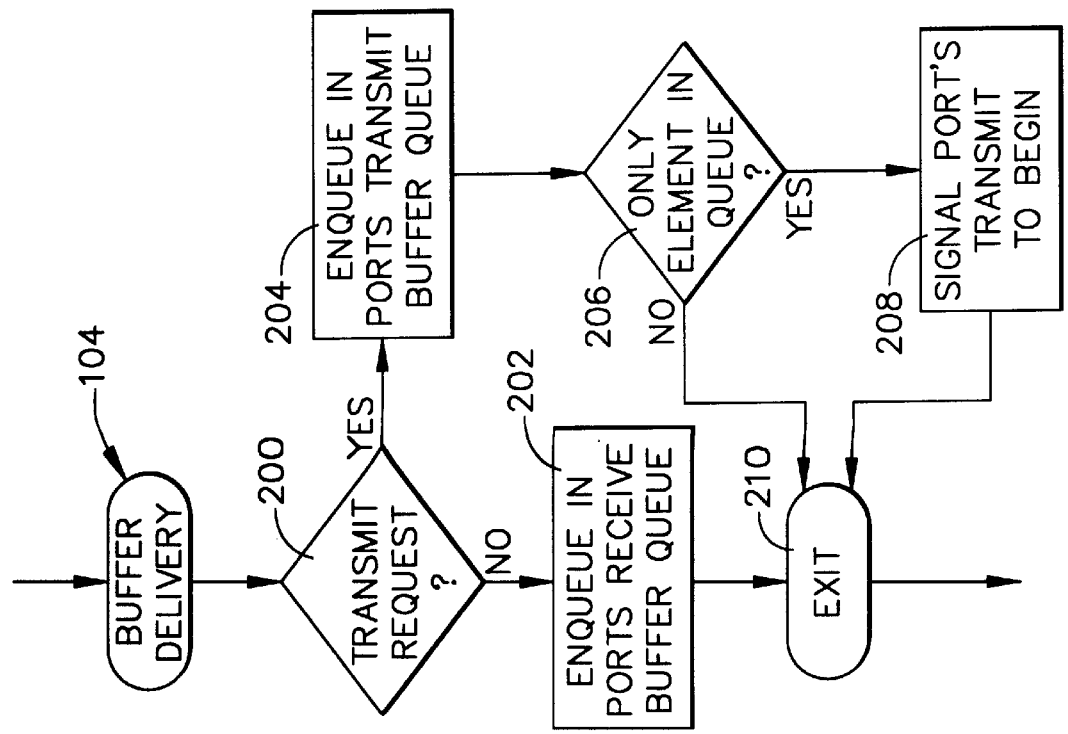
FIG. 5 is a flow chart of the "Buffer Delivery" function of the Infrared Buffer Manager depicted in FIG. 3.

FIG. 5 represents a flow chart of the Buffer Delivery function 104. Starting at a decision block 200, it is determined if a transmission or a reception is being requested. If this is a transmit request, a function block 204 will enqueue the data (i.e., add data to a queue) in the "ports transmit buffer queue." If instead this is a receive request, the logic flow is directed to a function block 202 that enqueues the data in the "ports receive buffer queue."

There are preferably four different types of queues used in the communication system of the present invention: (1) a Free Transmit Buffers Queue, (2) a Free Receive Buffers Queue ( or "free buffer list"), (3) a Used Transmit Buffers Queue, and (4) a Used Receive Buffers Queue (or "receive queue"). The "free" transmit and receive buffers are essentially empty buffers that are available for use by the IR port. The "used" transmit and receive buffers are buffers that presently contain some valid data.

The logic flow is directed from function block 204 to a decision block 206 which asks if this data is the only element in the transmit queue. If the answer is YES, a function block 208 signals the IR port 18 to allow the transmission to begin. A function block 210 now exits from this routine. It will be understood that the receive buffers enqueued in the Ports Receive Buffer Queue could become backed up if the consumer fails to ask for data quickly enough. The consumer does so via the Data Request function 110, described in greater detail in reference to FIG. 7.

Figure 6:
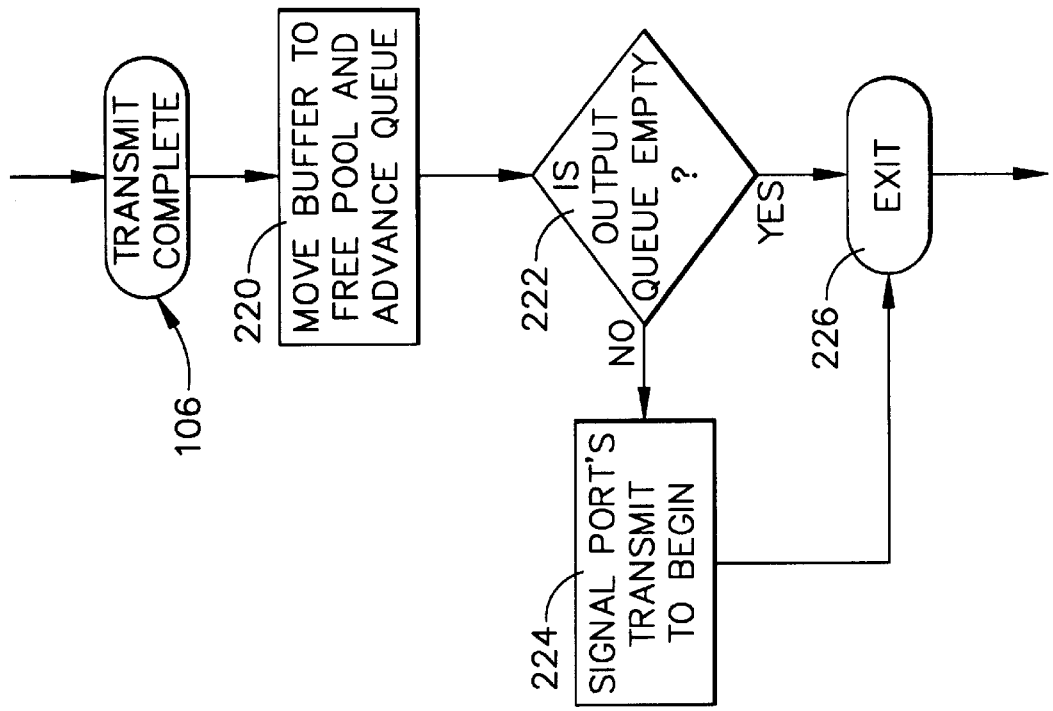
FIG. 6 is a flow chart of the "Transmit Complete" function of the Infrared Buffer Manager depicted in FIG. 3.

FIG. 6 is a flow chart of the Transmit Complete function 106. At a function block 220, the buffer is moved to the free pool, and the queue is advanced. This removes the transmit buffer from the used queue, and sends it to the new transmit buffers queue. At a decision block 222, it is determined whether or not the output queue is empty. If the answer is NO, a function block 224 will signal the IR port 18 that the transmission can begin. The logic flow is now directed to a function block 226 which exits this routine.

Figure 7:
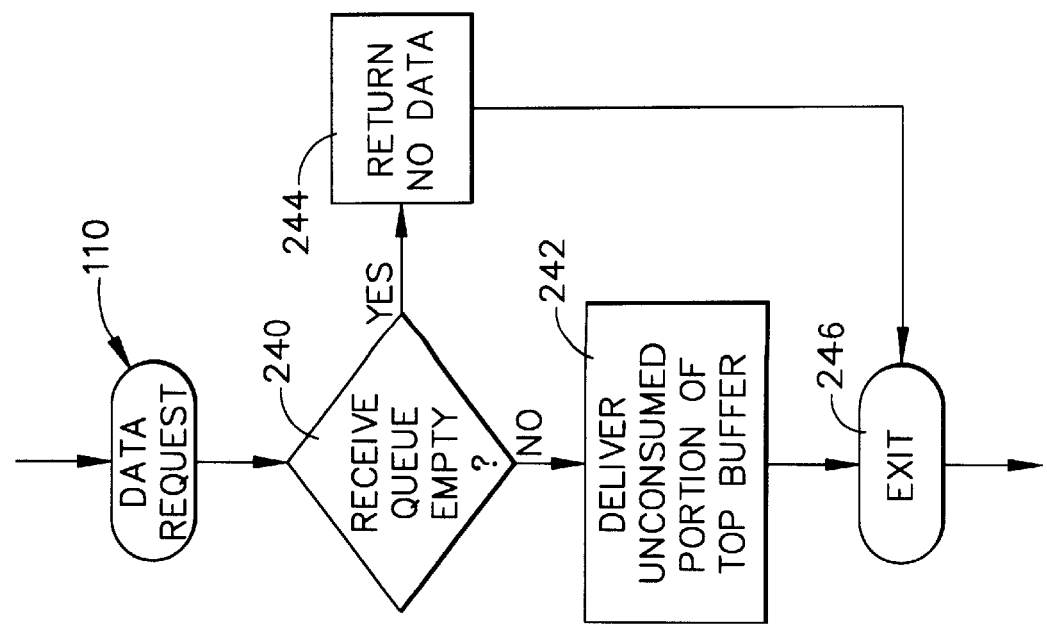
FIG. 7 is a flow chart of the "Data Request" function of the Infrared Buffer Manager depicted in FIG. 3.

FIG. 7 is a flow chart of the Data Request routine 110. A decision block 240 determines whether or not the receive queue is empty. If the answer is YES, then a function block 222 returns a message to the Data Consumer of "no data." If the answer is NO, that means there are presently some used receive buffers.

If there are used receive buffers, a function block 242 will deliver the unconsumed portions of the top buffer to the Data Consumer. This operation is performed one buffer at a time. An exit function 246 is now reached, which ends this routine.

Figure 8:
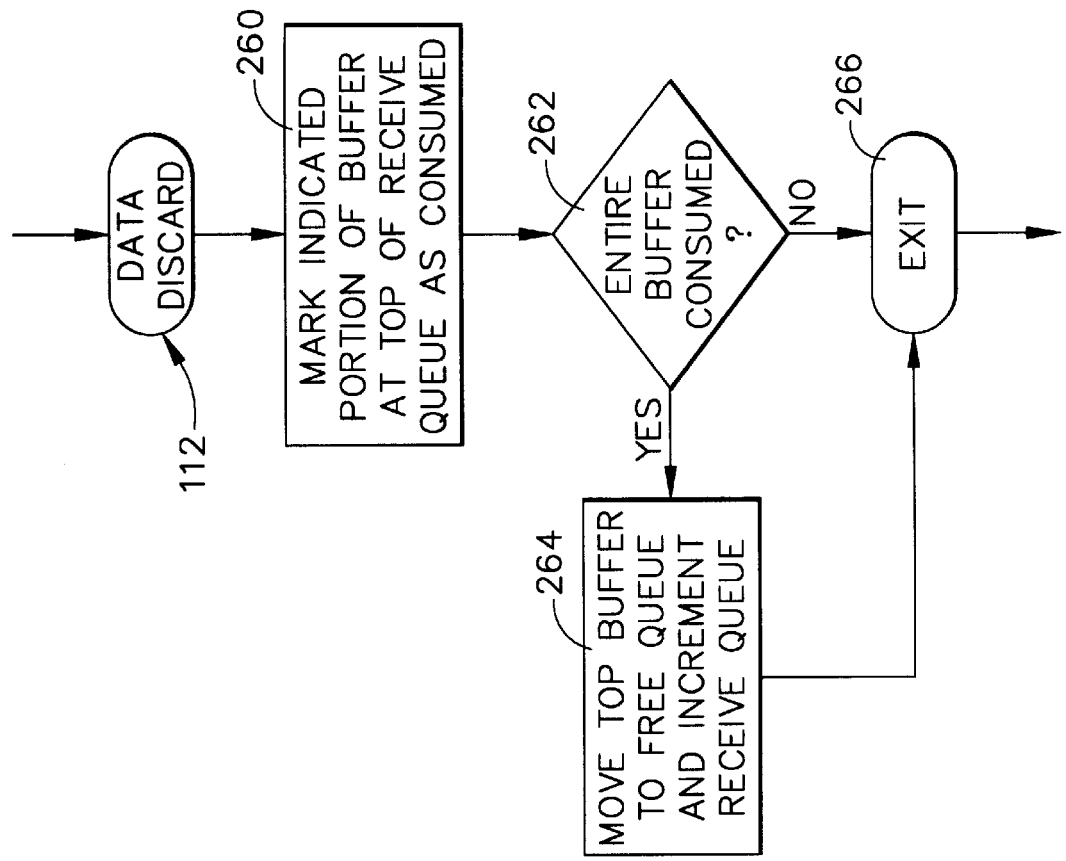
FIG. 8 is a flow chart of the "Data Discard" function of the Infrared Buffer Manager depicted in FIG. 3.

FIG. 8 is a flow chart of the Data Discard function 112. A function block 260 marks an "indicated portion of buffer" at the top of the receive queue as being "consumed." After that has occurred, a decision block 262 determines whether or not the entire receive buffer has been consumed. If the answer is YES, a function block 264 moves the top buffer of the Used Receive Buffers Queue to the New Receive Buffers Queue, and increments the receive queue. The logic flow now arrives at a function block 266 which exits this routine. The Data Discard function 112 essentially tells the IR Buffer Manager 100 that the data in the receive queue has been consumed.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. In a computer system having a memory storage device, a bi-directional communications port used in asynchronous communications, and a processing circuit, a method of efficiently allocating memory space for transmit and receive buffers, said method comprising: dividing a "pool area" of memory elements within said memory storage device into a plurality of transmit buffers and receive buffers by:

(a) creating a plurality of transmit buffers in which the number of said transmit buffers and size of each of said transmit buffers is dependent upon the total available pool size at the beginning of the reception of an asynchronous message at said communications port; and (b) creating a plurality of receive buffers in which the size of each of said receive buffers is dependent upon communications parameters, at the beginning of the reception of said message, relating to the type of communications link providing said message to said communications port, and dependent upon the total available pool size at the beginning of the reception of that message; and in which the number of receive buffers created within said pool area is further dependent upon the total available pool size and the size of said receive buffers at the beginning of the reception of said message at said communications port.

2. The method as recited in claim 1, wherein one of said communications parameters of the type of communications link providing said message to said communications port comprises the maximum turnaround time specification of said message being received at said communications port.

3. The method as recited in claim 2, wherein said maximum turnaround time specification of said message being received at said communications port is determined during a "discovery" procedure between said communications port of said printing apparatus and a transmitting station on the other end of said communications link.

4. The method as recited in claim 1, wherein said communications port comprises an infrared port.

5. The method as recited in claim 1, wherein said computer system is resident on a printing apparatus.

6. In a computer system having a memory storage device, a bi-directional communications port, and a processing circuit, a method of efficiently allocating memory space for transmit and receive buffers, said method comprising: dividing a "pool area" of memory elements within said memory storage device into a plurality of transmit buffers and receive buffers by:

(a) creating a plurality of transmit buffers in which the number of said transmit buffers and size of each of said transmit buffers is dependent upon the total available pool size at the beginning of the reception of a message at said communications port; and (b) creating a plurality of receive buffers in which the size of each of said receive buffers is dependent upon communications parameters relating to the type of communications link providing said message to said communications port, and dependent upon the total available pool size at the beginning of the reception of that message; and in which the number of receive buffers created within said pool area is further dependent upon the total available pool size and the size of said receive buffers at the beginning of the reception of said message at said communications port;

(c) wherein the maximum transmit packet buffer size for the secondary is the minimum of:

(i) {(maximum turnaround time of said communications link−minimum turnaround time of said infrared communications port of a transmitting device) * (transmission speed in bytes per millisecond)− number of BOF's of said transmitting device}, and (ii) (maximum packet size of said transmitting device).

7. In a computer system having a memory storage device, a bi-directional communications port, and a processing circuit, a method of efficiently allocating memory space for transmit and receive buffers, said method comprising: dividing a "pool area" of memory elements within said memory storage device into a plurality of transmit buffers and receive buffers by:

(a) creating a plurality of transmit buffers in which the number of said transmit buffers and size of each of said transmit buffers is dependent upon the total available pool size at the beginning of the reception of a message at said communications port; and (b) creating a plurality of receive buffers in which the size of each of said receive buffers is dependent upon communications parameters relating to the type of communications link providing said message to said communications port, and dependent upon the total available pool size at the beginning of the reception of that message; and in which the number of receive buffers created within said pool area is further dependent upon the total available pool size and the size of said receive buffers at the beginning of the reception of said message at said communications port;

(c) wherein the maximum useful size of said receive buffers is the minimum of:

(i) {(maximum turnaround time of said communications link−minimum turnaround time of said infrared communications port of said printing apparatus) * (transmission speed in bytes per millisecond)− number of BOF's of said printing apparatus}, and (ii) (maximum packet size of said printing apparatus).

8. The method as recited in claim 5, further comprising: further increasing the size of the transmit buffers when the type of connection between said printing apparatus and said transmitting station on the other end of said communications link exhibits a relatively slow data transmission speed.

9. The method as recited in claim 8, wherein said type of connection comprises a serial infrared communications link.

10. The method as recited in claim 5, wherein said printing apparatus limits the minimum number of transmit buffers and receive buffers to predetermined numbers, respectively, even where the pool size requires the size of each said transmit and receive buffers to be reduced to achieve said predetermined numbers.

11. The method as recited in claim 5, wherein said printing apparatus requires the minimum number of receive buffers to be greater than a window size of data packets that may be transmitted within a single turnaround time, according to the Infrared Data Association standard.

12. A computer system, comprising:

(a) a memory circuit, said memory circuit containing a "pool area" of memory elements, said pool area being divided into a plurality of transmit buffers and a plurality of receive buffers;

(b) a bi-directional communications port that is in asynchronous communication with at least one external device and with said memory circuit, said communications port providing data from said at least one external device to said plurality of receive buffers, and providing data to said at least one external device from said plurality of transmit buffers; and (c) a processing circuit that is configured to control the flow of data between said memory circuit and said communications port, said processing circuit also being configured to determine the number and size of said plurality of transmit and receive buffers, wherein:

the number of transmit buffers created within said pool area is dependent upon the total available pool size at the beginning of the reception of an asynchronous message at said communications port;

the size of each of said receive buffers is dependent upon communications parameters, at the beginning of the reception of said message, relating to the type of communications link providing said message to said communications port, and dependent upon the total available pool size at the beginning of the reception of that message; and the number of receive buffers created within said pool area is further dependent upon the total available pool size and the size of said receive buffers at the beginning of the reception of said message at said communications port.

13. The computer system as recited in claim 12, wherein one of said communications parameters of the type of communications link providing said message to said communications port comprises the maximum turnaround time specification of said message being received at said communications port.

14. The computer system as recited in claim 13, wherein said maximum turnaround time specification of said message being received at said communications port is determined during a "discovery" procedure between said communications port of said printing apparatus and a transmitting station on the other end of said communications link.

15. The computer system as recited in claim 12, wherein said communications port comprises an infrared port.

16. The computer system as recited in claim 12, wherein said computer system is resident on a printing apparatus.

17. A computer system, comprising:

(a) a memory circuit, said memory circuit containing a "pool area" of memory elements, said pool area being divided into a plurality of transmit buffers and a plurality of receive buffers;

(b) a bi-directional communications port that is in communication with at least one external device and with said memory circuit, said communications port providing data from said at least one external device to said plurality of receive buffers, and providing data to said at least one external device from said plurality of transmit buffers; and (c) a processing circuit that is configured to control the flow of data between said memory circuit and said communications port, said processing circuit also being configured to determine the number and size of said plurality of transmit and receive buffers, wherein:

the number of transmit buffers created within said pool area is dependent upon the total available pool size at the beginning of the reception of a message at said communications port;

the size of each of said receive buffers is dependent upon communications parameters relating to the type of communications link providing said message to said communications port, and dependent upon the total available pool size at the beginning of the reception of that message;

the number of receive buffers created within said pool area is further dependent upon the total available pool size and the size of said receive buffers at the beginning of the reception of said message at said communications port; and the maximum transmit packet buffer size for the secondary is the minimum of:

(i) {(maximum turnaround time of said communications link−minimum turnaround time of said infrared communications port of a transmitting device * (transmission speed in bytes per millisecond)− number of BOF's of said transmitting device}, and (ii) (maximum packet size of said transmitting device).

18. A computer system, comprising:
(a) a memory circuit, said memory circuit containing a "pool area" of memory elements, said pool area being divided into a plurality of transmit buffers and a plurality of receive buffers;
(b) a bi-directional communications port that is in communication with at least one external device and with said memory circuit, said communications port providing data from said at least one external device to said plurality of receive buffers, and providing data to said at least one external device from said plurality of transmit buffers; and
(c) a processing circuit that is configured to control the flow of data between said memory circuit and said communications port, said processing circuit also being configured to determine the number and size of said plurality of transmit and receive buffers, wherein:
the number of transmit buffers created within said pool area is dependent upon the total available pool size at the beginning of the reception of a message at said communications port;
the size of each of said receive buffers is dependent upon communications parameters relating to the type of communications link providing said message to said communications port, and dependent upon the total available pool size at the beginning of the reception of that message;
the number of receive buffers created within said pool area is further dependent upon the total available pool size and the size of said receive buffers at the beginning of the reception of said message at said communications port; and the maximum useful size of said receive buffers is the minimum of:
(i) {(maximum turnaround time of said communications link−minimum turnaround time of said infrared communications port of said printing apparatus) * (transmission speed in bytes per millisecond)−number of BOF's of said printing apparatus}, and
(ii) (maximum packet size of said printing apparatus).

19. The printing apparatus as recited in claim 16, wherein said processing circuit is further configured to further increase the size of the transmit buffers when the type of connection between said printing apparatus and said transmitting station on the other end of said communications link exhibits a relatively slow data transmission speed.

20. The printing apparatus as recited in claim 19, wherein said type of connection comprises a serial infrared communications link.

21. The printing apparatus as recited in claim 16, wherein said printing apparatus limits the minimum number of transmit buffers and receive buffers to predetermined numbers, respectively, even where the pool size requires the size of each said transmit and receive buffers to be reduced to achieve said predetermined numbers.

22. The printing apparatus as recited in claim 16, wherein said printing apparatus requires the minimum number of receive buffers to be greater than a window size of data packets that may be transmitted within a single turnaround time, according to the Infrared Data Association standard.

* * * * *